(12) United States Patent
Lim et al.

(10) Patent No.: US 9,042,326 B2
(45) Date of Patent: May 26, 2015

(54) METHOD AND DEVICE FOR TRANSMITTING UPLINK DATA IN WIRELESS CONNECTION SYSTEM

(75) Inventors: Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 13/805,129

(22) PCT Filed: Jun. 24, 2011

(86) PCT No.: PCT/KR2011/004615
§ 371 (c)(1),
(2), (4) Date: Dec. 18, 2012

(87) PCT Pub. No.: WO2011/162565
PCT Pub. Date: Dec. 29, 2011

(65) Prior Publication Data
US 2013/0089061 A1 Apr. 11, 2013

Related U.S. Application Data

(60) Provisional application No. 61/357,989, filed on Jun. 24, 2010.

(51) Int. Cl.
*H04W 4/00* (2009.01)
*H04W 72/04* (2009.01)
*H04W 74/06* (2009.01)

(52) U.S. Cl.
CPC .......... *H04W 72/0413* (2013.01); *H04W 4/005* (2013.01); *H04W 74/06* (2013.01)

(58) Field of Classification Search
CPC ........................................................ H04W 4/005
USPC .......................................................... 370/329
See application file for complete search history.

(56) References Cited

U.S. PATENT DOCUMENTS

| 8,180,326 | B2 * | 5/2012 | Hahn et al. ..................... 455/411 |
| 8,204,147 | B2 * | 6/2012 | Josiam et al. ................. 375/295 |
| 8,432,870 | B2 * | 4/2013 | Maheshwari et al. ........ 370/331 |
| 8,588,803 | B2 * | 11/2013 | Hakola et al. .............. 455/452.2 |

(Continued)

OTHER PUBLICATIONS

3rd Generation Partnership Project (3GPP), "Technical Specification Group Services and System Aspects; Study on Facilitating Machine to Machine Communication in 3GPP Systems; (Release 8)", 3GPP TR 22.868 V8.0.0, Mar. 2007, 15 pages.

(Continued)

*Primary Examiner* — Mark Rinehart
*Assistant Examiner* — Maharishi Khirodhar
(74) *Attorney, Agent, or Firm* — Lee, Hong, Degerman, Kang & Waimey

(57) ABSTRACT

The present invention relates to a wireless communication system, more specifically a method for transmitting uplink through random access, and comprises: a step for receiving from a base station a first message which includes Machine Type Communication (MTC)-specific bandwidth request channel information for requesting bandwidth of MTC terminals; and a step for transmitting to the base station through the MTC-specific bandwidth request channel at least on of either bandwidth request preamble and bandwidth request information, wherein the bandwidth request information includes at least one of the following: MTC terminal identifier, quality of service (QoS), bandwidth request indicator, and bandwidth request size.

11 Claims, 12 Drawing Sheets

(56) References Cited

U.S. PATENT DOCUMENTS

| | | | | |
|---|---|---|---|---|
| 2007/0253379 | A1* | 11/2007 | Kumar et al. | 370/338 |
| 2009/0296622 | A1* | 12/2009 | Pisut et al. | 370/312 |
| 2009/0323602 | A1* | 12/2009 | Li et al. | 370/329 |
| 2010/0067467 | A1* | 3/2010 | Cho et al. | 370/329 |
| 2010/0214985 | A1* | 8/2010 | Chun et al. | 370/328 |
| 2011/0275379 | A1* | 11/2011 | Hakola et al. | 455/450 |

OTHER PUBLICATIONS

3rd Generation Partnership Project (3GPP), "Technical Specification Group Services and System Aspects; Service requirements for machine-type communications; Stage 1 (Release 10)", 3GPP TS 22.368 V1.1.1, Nov. 2009, 23 pages (Relevant Section: 5.1).

Fujitsu, "RAN Impacts of machine-type communications for UTRA and EUTRA", R2-10xxxx (R2-100412), 3GPP TSG-RAN WG2 Meeting #68bis, Jan. 2010, 4 pages.

PCT International Application No. PCT/KR2011/004615, Written Opinion of the International Searching Authority dated Feb. 29, 2012, 15 pages.

* cited by examiner

FIG. 6

| Pr$_0$ | Pr$_4$ | Pr$_8$ | Pr$_{12}$ | Pr$_{16}$ | Pr$_{20}$ |
|---|---|---|---|---|---|
| Pr$_1$ | Pr$_5$ | Pr$_9$ | Pr$_{13}$ | Pr$_{17}$ | Pr$_{21}$ |
| M$_0$ | M$_6$ | M$_{12}$ | M$_{18}$ | M$_{24}$ | M$_{30}$ |
| M$_1$ | M$_7$ | M$_{13}$ | M$_{19}$ | M$_{25}$ | M$_{31}$ |
| Pr$_2$ | Pr$_6$ | Pr$_{10}$ | Pr$_{14}$ | Pr$_{18}$ | Pr$_{22}$ |
| Pr$_3$ | Pr$_7$ | Pr$_{11}$ | Pr$_{15}$ | Pr$_{19}$ | Pr$_{23}$ |

| Pr$_0$ | Pr$_4$ | Pr$_8$ | Pr$_{12}$ | Pr$_{16}$ | Pr$_{20}$ |
|---|---|---|---|---|---|
| Pr$_1$ | Pr$_5$ | Pr$_9$ | Pr$_{13}$ | Pr$_{17}$ | Pr$_{21}$ |
| M$_2$ | M$_8$ | M$_{14}$ | M$_{20}$ | M$_{26}$ | M$_{32}$ |
| M$_3$ | M$_9$ | M$_{15}$ | M$_{21}$ | M$_{27}$ | M$_{33}$ |
| Pr$_2$ | Pr$_6$ | Pr$_{10}$ | Pr$_{14}$ | Pr$_{18}$ | Pr$_{22}$ |
| Pr$_3$ | Pr$_7$ | Pr$_{11}$ | Pr$_{15}$ | Pr$_{19}$ | Pr$_{23}$ |

| Pr$_0$ | Pr$_4$ | Pr$_8$ | Pr$_{12}$ | Pr$_{16}$ | Pr$_{20}$ |
|---|---|---|---|---|---|
| Pr$_1$ | Pr$_5$ | Pr$_9$ | Pr$_{13}$ | Pr$_{17}$ | Pr$_{21}$ |
| M$_4$ | M$_{10}$ | M$_{16}$ | M$_{22}$ | M$_{28}$ | M$_{34}$ |
| M$_5$ | M$_{11}$ | M$_{17}$ | M$_{23}$ | M$_{29}$ | M$_{35}$ |
| Pr$_2$ | Pr$_6$ | Pr$_{10}$ | Pr$_{14}$ | Pr$_{18}$ | Pr$_{22}$ |
| Pr$_3$ | Pr$_7$ | Pr$_{11}$ | Pr$_{15}$ | Pr$_{19}$ | Pr$_{23}$ |

FIG. 9A

| $Pr_0$ | $Pr_1$ | $Pr_2$ | $Pr_3$ | $Pr_4$ | $Pr_5$ |
|---|---|---|---|---|---|
| $Pr_6$ | $Pr_7$ | $Pr_8$ | $Pr_9$ | $Pr_{10}$ | $Pr_{11}$ |
| $Pr_{12}$ | $Pr_{13}$ | $Pr_{14}$ | $Pr_{15}$ | $Pr_{16}$ | $Pr_{17}$ |
| $Pr_{18}$ | $Pr_{19}$ | $Pr_{20}$ | $Pr_{21}$ | $Pr_{22}$ | $Pr_{23}$ |
| $Pr_{24}$ | $Pr_{25}$ | $Pr_{26}$ | $Pr_{27}$ | $Pr_{28}$ | $Pr_{29}$ |
| $Pr_{30}$ | $Pr_{31}$ | $Pr_{32}$ | $Pr_{33}$ | $Pr_{34}$ | $Pr_{35}$ |

⋮

| $Pr_0$ | $Pr_1$ | $Pr_2$ | $Pr_3$ | $Pr_4$ | $Pr_5$ |
|---|---|---|---|---|---|
| $Pr_6$ | $Pr_7$ | $Pr_8$ | $Pr_9$ | $Pr_{10}$ | $Pr_{11}$ |
| $Pr_{12}$ | $Pr_{13}$ | $Pr_{14}$ | $Pr_{15}$ | $Pr_{16}$ | $Pr_{17}$ |
| $Pr_{18}$ | $Pr_{19}$ | $Pr_{20}$ | $Pr_{21}$ | $Pr_{22}$ | $Pr_{23}$ |
| $Pr_{24}$ | $Pr_{25}$ | $Pr_{26}$ | $Pr_{27}$ | $Pr_{28}$ | $Pr_{29}$ |
| $Pr_{30}$ | $Pr_{31}$ | $Pr_{32}$ | $Pr_{33}$ | $Pr_{34}$ | $Pr_{35}$ |

⋮

| $Pr_0$ | $Pr_1$ | $Pr_2$ | $Pr_3$ | $Pr_4$ | $Pr_5$ |
|---|---|---|---|---|---|
| $Pr_6$ | $Pr_7$ | $Pr_8$ | $Pr_9$ | $Pr_{10}$ | $Pr_{11}$ |
| $Pr_{12}$ | $Pr_{13}$ | $Pr_{14}$ | $Pr_{15}$ | $Pr_{16}$ | $Pr_{17}$ |
| $Pr_{18}$ | $Pr_{19}$ | $Pr_{20}$ | $Pr_{21}$ | $Pr_{22}$ | $Pr_{23}$ |
| $Pr_{24}$ | $Pr_{25}$ | $Pr_{26}$ | $Pr_{27}$ | $Pr_{28}$ | $Pr_{29}$ |
| $Pr_{30}$ | $Pr_{31}$ | $Pr_{32}$ | $Pr_{33}$ | $Pr_{34}$ | $Pr_{35}$ |

Time →

Frequency ↓

| $Pr_0$ | $Pr_1$ | $Pr_2$ | $Pr_3$ | $Pr_4$ | $Pr_5$ |
|---|---|---|---|---|---|
| $Pr_6$ | $Pr_7$ | $Pr_8$ | $Pr_9$ | $Pr_{10}$ | $Pr_{11}$ |
| $Pr_{12}$ | $Pr_{13}$ | $Pr_{14}$ | $Pr_{15}$ | $Pr_{16}$ | $Pr_{17}$ |
| $Pr_{18}$ | $Pr_{19}$ | $Pr_{20}$ | $Pr_{21}$ | $Pr_{22}$ | $Pr_{23}$ |
| $Pr_{24}$ | $Pr_{25}$ | $Pr_{26}$ | $Pr_{27}$ | $Pr_{28}$ | $Pr_{29}$ |
| $Pr_{30}$ | $Pr_{31}$ | $Pr_{32}$ | $Pr_{33}$ | $Pr_{34}$ | $Pr_{35}$ |

⋮

| $Pr_{36}$ | $Pr_{37}$ | $Pr_{38}$ | $Pr_{39}$ | $Pr_{40}$ | $Pr_{41}$ |
|---|---|---|---|---|---|
| $Pr_{42}$ | $Pr_{43}$ | $Pr_{44}$ | $Pr_{45}$ | $Pr_{46}$ | $Pr_{47}$ |
| $Pr_{48}$ | $Pr_{49}$ | $Pr_{50}$ | $Pr_{51}$ | $Pr_{52}$ | $Pr_{53}$ |
| $Pr_{54}$ | $Pr_{55}$ | $Pr_{56}$ | $Pr_{57}$ | $Pr_{58}$ | $Pr_{59}$ |
| $Pr_{60}$ | $Pr_{61}$ | $Pr_{62}$ | $Pr_{63}$ | $Pr_{64}$ | $Pr_{65}$ |
| $Pr_{66}$ | $Pr_{67}$ | $Pr_{68}$ | $Pr_{69}$ | $Pr_{70}$ | $Pr_{71}$ |

⋮

| $Pr_{72}$ | $Pr_{73}$ | $Pr_{74}$ | $Pr_{75}$ | $Pr_{76}$ | $Pr_{77}$ |
|---|---|---|---|---|---|
| $Pr_{78}$ | $Pr_{79}$ | $Pr_{80}$ | $Pr_{81}$ | $Pr_{82}$ | $Pr_{83}$ |
| $Pr_{84}$ | $Pr_{85}$ | $Pr_{86}$ | $Pr_{87}$ | $Pr_{88}$ | $Pr_{89}$ |
| $Pr_{90}$ | $Pr_{91}$ | $Pr_{92}$ | $Pr_{93}$ | $Pr_{94}$ | $Pr_{95}$ |
| $Pr_{96}$ | $Pr_{97}$ | $Pr_{98}$ | $Pr_{99}$ | $Pr_{100}$ | $Pr_{101}$ |
| $Pr_{102}$ | $Pr_{103}$ | $Pr_{104}$ | $Pr_{105}$ | $Pr_{106}$ | $Pr_{107}$ |

FIG. 9D

| | | | | | |
|---|---|---|---|---|---|
| $Pr_0$ | $Pr_{18}$ | $Pr_{36}$ | $Pr_{54}$ | $Pr_{72}$ | $Pr_{90}$ |
| $Pr_1$ | $Pr_{19}$ | $Pr_{37}$ | $Pr_{55}$ | $Pr_{73}$ | $Pr_{91}$ |
| $Pr_2$ | $Pr_{20}$ | $Pr_{38}$ | $Pr_{56}$ | $Pr_{74}$ | $Pr_{92}$ |
| $Pr_3$ | $Pr_{21}$ | $Pr_{39}$ | $Pr_{57}$ | $Pr_{75}$ | $Pr_{93}$ |
| $Pr_4$ | $Pr_{22}$ | $Pr_{40}$ | $Pr_{58}$ | $Pr_{76}$ | $Pr_{94}$ |
| $Pr_5$ | $Pr_{23}$ | $Pr_{41}$ | $Pr_{59}$ | $Pr_{77}$ | $Pr_{95}$ |

⋮

| | | | | | |
|---|---|---|---|---|---|
| $Pr_6$ | $Pr_{24}$ | $Pr_{42}$ | $Pr_{60}$ | $Pr_{78}$ | $Pr_{96}$ |
| $Pr_7$ | $Pr_{25}$ | $Pr_{43}$ | $Pr_{61}$ | $Pr_{79}$ | $Pr_{97}$ |
| $Pr_8$ | $Pr_{26}$ | $Pr_{44}$ | $Pr_{62}$ | $Pr_{80}$ | $Pr_{98}$ |
| $Pr_9$ | $Pr_{27}$ | $Pr_{45}$ | $Pr_{63}$ | $Pr_{81}$ | $Pr_{99}$ |
| $Pr_{10}$ | $Pr_{28}$ | $Pr_{46}$ | $Pr_{64}$ | $Pr_{82}$ | $Pr_{100}$ |
| $Pr_{11}$ | $Pr_{29}$ | $Pr_{47}$ | $Pr_{65}$ | $Pr_{83}$ | $Pr_{101}$ |

⋮

| | | | | | |
|---|---|---|---|---|---|
| $Pr_{12}$ | $Pr_{30}$ | $Pr_{48}$ | $Pr_{66}$ | $Pr_{84}$ | $Pr_{102}$ |
| $Pr_{13}$ | $Pr_{31}$ | $Pr_{49}$ | $Pr_{67}$ | $Pr_{85}$ | $Pr_{103}$ |
| $Pr_{14}$ | $Pr_{32}$ | $Pr_{50}$ | $Pr_{68}$ | $Pr_{86}$ | $Pr_{104}$ |
| $Pr_{15}$ | $Pr_{33}$ | $Pr_{51}$ | $Pr_{69}$ | $Pr_{87}$ | $Pr_{105}$ |
| $Pr_{16}$ | $Pr_{34}$ | $Pr_{52}$ | $Pr_{70}$ | $Pr_{88}$ | $Pr_{106}$ |
| $Pr_{17}$ | $Pr_{35}$ | $Pr_{53}$ | $Pr_{71}$ | $Pr_{89}$ | $Pr_{107}$ |

Time → / Frequency ↓

FIG. 10A

| Pr$_0$ | Pr$_1$ | Pr$_2$ | Pr$_3$ | Pr$_4$ | Pr$_5$ |
|---|---|---|---|---|---|
| M$_0$ | M$_4$ | M$_8$ | M$_{12}$ | M$_{16}$ | M$_{20}$ |
| M$_1$ | M$_5$ | M$_9$ | M$_{13}$ | M$_{17}$ | M$_{21}$ |
| M$_2$ | M$_6$ | M$_{10}$ | M$_{14}$ | M$_{18}$ | M$_{22}$ |
| M$_3$ | M$_7$ | M$_{11}$ | M$_{15}$ | M$_{19}$ | M$_{23}$ |
| Pr$_6$ | Pr$_7$ | Pr$_8$ | Pr$_9$ | Pr$_{10}$ | Pr$_{11}$ |

⋮

| Pr$_{12}$ | Pr$_{13}$ | Pr$_{14}$ | Pr$_{15}$ | Pr$_{16}$ | Pr$_{17}$ |
|---|---|---|---|---|---|
| M$_{24}$ | M$_{28}$ | M$_{32}$ | M$_{36}$ | M$_{40}$ | M$_{44}$ |
| M$_{25}$ | M$_{29}$ | M$_{33}$ | M$_{37}$ | M$_{41}$ | M$_{45}$ |
| M$_{26}$ | M$_{30}$ | M$_{34}$ | M$_{38}$ | M$_{42}$ | M$_{46}$ |
| M$_{27}$ | M$_{31}$ | M$_{35}$ | M$_{39}$ | M$_{43}$ | M$_{47}$ |
| Pr$_{18}$ | Pr$_{19}$ | Pr$_{20}$ | Pr$_{21}$ | Pr$_{22}$ | Pr$_{23}$ |

⋮

| Pr$_{24}$ | Pr$_{25}$ | Pr$_{26}$ | Pr$_{27}$ | Pr$_{28}$ | Pr$_{29}$ |
|---|---|---|---|---|---|
| M$_{48}$ | M$_{52}$ | M$_{56}$ | M$_{60}$ | M$_{64}$ | M$_{68}$ |
| M$_{49}$ | M$_{53}$ | M$_{57}$ | M$_{61}$ | M$_{65}$ | M$_{69}$ |
| M$_{50}$ | M$_{54}$ | M$_{58}$ | M$_{62}$ | M$_{66}$ | M$_{70}$ |
| M$_{51}$ | M$_{55}$ | M$_{59}$ | M$_{63}$ | M$_{67}$ | M$_{71}$ |
| Pr$_{30}$ | Pr$_{31}$ | Pr$_{32}$ | Pr$_{33}$ | Pr$_{34}$ | Pr$_{35}$ |

Time →
Frequency ↓

FIG. 10B

| Pr$_0$ | Pr$_1$ | Pr$_2$ | Pr$_3$ | Pr$_4$ | Pr$_5$ |
|---|---|---|---|---|---|
| M$_0$ | M$_1$ | M$_2$ | M$_3$ | M$_4$ | M$_5$ |
| M$_6$ | M$_7$ | M$_8$ | M$_9$ | M$_{10}$ | M$_{11}$ |
| M$_{12}$ | M$_{13}$ | M$_{14}$ | M$_{15}$ | M$_{16}$ | M$_{17}$ |
| M$_{18}$ | M$_{19}$ | M$_{20}$ | M$_{21}$ | M$_{22}$ | M$_{23}$ |
| Pr$_6$ | Pr$_7$ | Pr$_8$ | Pr$_9$ | Pr$_{10}$ | Pr$_{11}$ |

⋮

| Pr$_{12}$ | Pr$_{13}$ | Pr$_{14}$ | Pr$_{15}$ | Pr$_{16}$ | Pr$_{17}$ |
|---|---|---|---|---|---|
| M$_{24}$ | M$_{25}$ | M$_{26}$ | M$_{27}$ | M$_{28}$ | M$_{29}$ |
| M$_{30}$ | M$_{31}$ | M$_{32}$ | M$_{33}$ | M$_{34}$ | M$_{35}$ |
| M$_{36}$ | M$_{37}$ | M$_{38}$ | M$_{39}$ | M$_{40}$ | M$_{41}$ |
| M$_{42}$ | M$_{43}$ | M$_{44}$ | M$_{45}$ | M$_{46}$ | M$_{47}$ |
| Pr$_{18}$ | Pr$_{19}$ | Pr$_{20}$ | Pr$_{21}$ | Pr$_{22}$ | Pr$_{23}$ |

⋮

| Pr$_{24}$ | Pr$_{25}$ | Pr$_{26}$ | Pr$_{27}$ | Pr$_{28}$ | Pr$_{29}$ |
|---|---|---|---|---|---|
| M$_{48}$ | M$_{49}$ | M$_{50}$ | M$_{51}$ | M$_{52}$ | M$_{53}$ |
| M$_{54}$ | M$_{55}$ | M$_{56}$ | M$_{57}$ | M$_{58}$ | M$_{59}$ |
| M$_{60}$ | M$_{61}$ | M$_{62}$ | M$_{63}$ | M$_{64}$ | M$_{65}$ |
| M$_{66}$ | M$_{67}$ | M$_{68}$ | M$_{69}$ | M$_{70}$ | M$_{71}$ |
| Pr$_{30}$ | Pr$_{31}$ | Pr$_{32}$ | Pr$_{33}$ | Pr$_{34}$ | Pr$_{35}$ |

FIG. 10C

| Pr$_0$ | Pr$_1$ | Pr$_2$ | Pr$_3$ | Pr$_4$ | Pr$_5$ |
|---|---|---|---|---|---|
| M$_0$ | M$_1$ | M$_2$ | M$_3$ | M$_4$ | M$_5$ |
| Pr$_6$ | Pr$_7$ | Pr$_8$ | Pr$_9$ | Pr$_{10}$ | Pr$_{11}$ |
| Pr$_{12}$ | Pr$_{13}$ | Pr$_{14}$ | Pr$_{15}$ | Pr$_{16}$ | Pr$_{17}$ |
| M$_6$ | M$_7$ | M$_8$ | M$_9$ | M$_{10}$ | M$_{11}$ |
| Pr$_{18}$ | Pr$_{19}$ | Pr$_{20}$ | Pr$_{21}$ | Pr$_{22}$ | Pr$_{23}$ |

⋮

| Pr$_0$ | Pr$_1$ | Pr$_2$ | Pr$_3$ | Pr$_4$ | Pr$_5$ |
|---|---|---|---|---|---|
| M$_{12}$ | M$_{13}$ | M$_{14}$ | M$_{15}$ | M$_{16}$ | M$_{17}$ |
| Pr$_6$ | Pr$_7$ | Pr$_8$ | Pr$_9$ | Pr$_{10}$ | Pr$_{11}$ |
| Pr$_{12}$ | Pr$_{13}$ | Pr$_{14}$ | Pr$_{15}$ | Pr$_{16}$ | Pr$_{17}$ |
| M$_{18}$ | M$_{19}$ | M$_{20}$ | M$_{21}$ | M$_{22}$ | M$_{23}$ |
| Pr$_{18}$ | Pr$_{19}$ | Pr$_{20}$ | Pr$_{21}$ | Pr$_{22}$ | Pr$_{23}$ |

⋮

| Pr$_0$ | Pr$_1$ | Pr$_2$ | Pr$_3$ | Pr$_4$ | Pr$_5$ |
|---|---|---|---|---|---|
| M$_{24}$ | M$_{25}$ | M$_{26}$ | M$_{27}$ | M$_{28}$ | M$_{29}$ |
| Pr$_6$ | Pr$_7$ | Pr$_8$ | Pr$_9$ | Pr$_{10}$ | Pr$_{11}$ |
| Pr$_{12}$ | Pr$_{13}$ | Pr$_{14}$ | Pr$_{15}$ | Pr$_{16}$ | Pr$_{17}$ |
| M$_{30}$ | M$_{31}$ | M$_{32}$ | M$_{33}$ | M$_{34}$ | M$_{35}$ |
| Pr$_{18}$ | Pr$_{19}$ | Pr$_{20}$ | Pr$_{21}$ | Pr$_{22}$ | Pr$_{23}$ |

METHOD AND DEVICE FOR TRANSMITTING UPLINK DATA IN WIRELESS CONNECTION SYSTEM

CROSS-REFERENCE TO RELATED APPLICATIONS

This application is the National Stage filing under 35 U.S.C. 371 of International Application No. PCT/KR2011/004615, filed on Jun. 24, 2011, which claims the benefit of U.S. Provisional Application Ser. No. 61/357,989, filed on Jun. 24, 2010, the contents of which are all hereby incorporated by reference herein in their entirety.

FIELD OF THE INVENTION

The present invention relates to a wireless communication system, and more particularly to a method and apparatus for performing uplink transmission of an Machine Type Communication (MTC) user equipment (UE).

BACKGROUND ART

M2M Communication, Machine Type Communication: MTC

M2M communication will hereinafter be described in brief.

Machine-to-machine (M2M) communication is communication between electronic devices as its appellation implies. While M2M communication means wired or wireless communication between electronic devices or communication between a human-controlled device and a machine in the broadest sense, these days M2M communication typically refers to wireless communication between electronic devices. In addition, M2M UEs used in a cellular network have lower throughput or capability than general UEs.

Many UEs are present in the cell, so that the UEs can be classified according to types, class, service types, etc. of UEs.

For example, UEs can be classified into a Human Type Communication (HTC) UE and a Machine Type Communication (MTC) UE. In this case, HTC means that signal transmission is decided by a human being so as to implement signal transmission/reception. MTC means that each device performs periodic signal transmission due to the occurrence of event without human intervention.

In addition, considering M2M communication or MTC, a total number of UEs can be abruptly increased. M2M UEs have the following characteristics according to supported services.

1. Many UEs existing in a cell
2. A small amount of data.
3. Low transmission frequency (Periodicity)
4. Limited number of data properties
5. Not sensitive to time delay
6. M2M UE may have low mobility or be fixed.

DETAILED DESCRIPTION OF THE INVENTION

Technical Problem

As described above, HTC and MTC have different service types, operators, usages, etc. It is difficult for a UL transmission method defined for supporting the HTC UE to be applied to UL transmission of the MTC UE.

An object of the present invention is to provide a method for minimizing UL transmission influence of a legacy HTC UE, a resource allocation method for performing UL transmission of the MTC UE, and a method for requesting UL resources of the MTC UE.

In addition, assuming that the MTC UE is switched from an idle/sleep mode to an active mode and performs BS- or network-entry or reentry, if the MTC UE uses a ranging sequence as in the HTC UE, the number of ranging sequences caused by many MTC UEs contained in the cell becomes insufficient. In addition, a long time is unavoidably consumed when the HTC UE and MTC UE are detected in the BS or network, so that a long time is also consumed when the MTC UE performs BS or network reentry.

Therefore, an object of the present invention is to provide a method for enabling an MT CUE to switch from an idle/sleep mode to an active mode so as to quickly perform BS or network (re)entry, thereby providing a method for allocating an MTC dedicated sequence (or codeword, for example, quick access signal/MTC UE-specific ranging sequence) and resources.

Technical Solution

The object of the present invention can be achieved by providing a method for performing uplink (UL) transmission through random access in a wireless communication system, the method including: receiving a first message including Machine Type Communication (MTC) dedicated bandwidth request channel information for performing a bandwidth request of each MTC mobile station (MS) from a base station (BS); and transmitting at least one of a bandwidth request preamble and bandwidth request information to the base station (BS) through the MTC dedicated bandwidth request channel, wherein the bandwidth request information includes at least one of an MTC MS identifier (ID), a Quality of Service (QoS), a bandwidth request indicator, and a bandwidth request size.

The method may further include: receiving a bandwidth request acknowledgement—A-MAP information element (BR_ACK A-MAP IE) from the base station; receiving an uplink (UL) grant for UL transmission from the base station; and transmitting UL data to the base station through the received UL grant.

The MTC dedicated bandwidth request channel may be received from the base station through at least one subframe using Time Division Multiplexing (TDM) or Frequency Division Multiplexing (FDM).

The MTC dedicated bandwidth request channel may be located in front of or behind a bandwidth channel for a Human Type Communication (HTC) mobile station (MS).

The first message may be a secondary superframe header subpacket information element (S-SFH SP IE) or an A-MAP information element (A-MAP IE).

The S-SFH SP IE may be an S-SFH SP 3 IE, and the A-MAP IE is a user-specific A-MAP IE or a non-user specific A-MAP IE.

The first message may be transmitted using a broadcast or unicast scheme.

The MTC dedicated bandwidth request channel may include three files, each of which includes 6 subcarriers and 6 symbols, wherein the one tile includes at least one of a first region via which the bandwidth request preamble is transmitted and a second region via which the bandwidth request information is transmitted.

The bandwidth request preamble may be a long preamble sequence corresponding to either 36 sequences mapped to the one tile or 108 sequences mapped to the three tiles.

The one tile may include at least one subtile, the subtile may include one subcarrier and 6 symbols, and if the one tile includes the first region and the second region, the second region may be mapped to second and fourth subtiles contained in the one tile.

The MTC dedicated bandwidth request channel information may include at least one of location, period, and length information of the MTC dedicated bandwidth request channel.

In another aspect of the present invention, a method for performing uplink (UL) transmission in a wireless communication system includes receiving a station identifier (STID) uniquely formed according to mobile station (MS) types from a base station (BS); transmitting a first message for a bandwidth request to the base station (BS), the first message including the received STID; receiving an uplink grant for UL transmission from the base station (BS); and transmitting UL data to the base station (BS) through the received UL grant, wherein the STID is a Machine Type Communication (MTC) MS ID.

The first message may be a MAC signaling header or a MAC message.

The MS type may include a first type supporting 802.16m and a second type supporting M2M communication or Machine Type Communication (MTC).

The first type MS ID is composed of 12 bits, and the second type MS ID is composed of 16 bits. In other words, if the MS transmits a BR message in the legacy system (for example, 802.16m system), information "STID (12 bits)+bandwidth request (BR) information (4 bits)" is transmitted, so that the second type MS ID is composed of 16 bits and influence of the legacy system can be reduced.

The UL grant may be allocated per MS type or per MS.

In another aspect of the present invention, a mobile station (MS) for performing uplink (UL) transmission through random access in a wireless communication system includes: a radio frequency (RF) unit for transmitting/receiving RF signals to/from an external part; and a controller coupled to the RF unit, wherein the controller controls the RF unit to receive a first message including Machine Type Communication (MTC) dedicated bandwidth request channel information for performing a bandwidth request of each MTC mobile station (MS) from a base station (BS), and the controller controls the RF unit to transmit at least one of a bandwidth request preamble and bandwidth request information to the base station (BS) through the MTC dedicated bandwidth request channel, wherein the bandwidth request information includes at least one of an MTC MS identifier (ID), a Quality of Service (QoS), a bandwidth request indicator, and a bandwidth request size.

Effects of the Invention

The embodiment of the present invention defines a resource allocation method and resource request method for performing UL transmission of an MTC UE. Although a large number of UE types are present in the cell, UL transmission influence of another UE is minimized by UL transmission of the MTC UE, and UL resources can be efficiently scheduled according to UE situations.

BRIEF DESCRIPTION OF THE DRAWINGS

FIG. 6 is a diagram illustrating one bandwidth request channel structure.

Figure 9B:
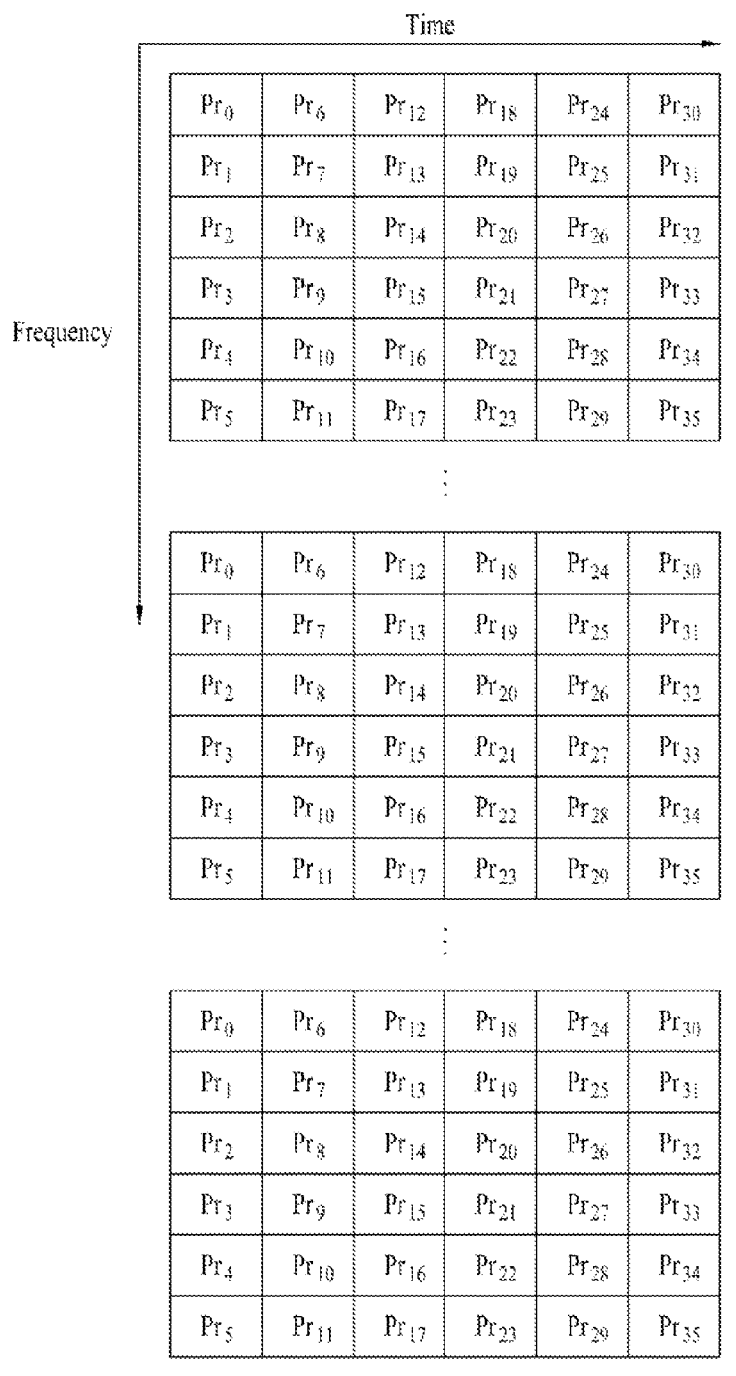

FIGS. 9A to 9D illustrate bandwidth request channel structures used when only a bandwidth request preamble is transmitted according to a first embodiment of the present invention.

FIGS. 10A to 10C illustrate bandwidth request channel structures used when a bandwidth request preamble and a quick access message are transmitted according to a first embodiment of the present invention.

BEST MODE FOR CARRYING OUT THE INVENTION

Figure 1:
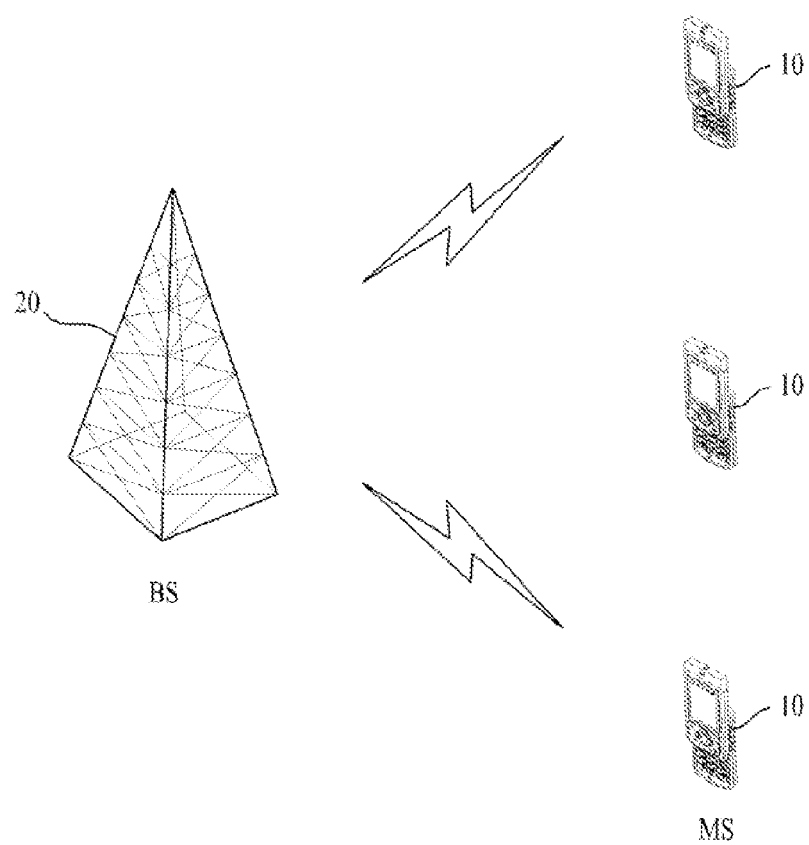
FIG. 1 is a block diagram illustrating a wireless communication system according to an embodiment of the present invention.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless communication technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. IEEE 802.16m is evolved from IEEE 802.16e, and provides backward compatibility with the IEEE 802.16e system.

UTRA is a part of the Universal Mobile Telecommunications System (UMTS).

3rd Generation Partnership Project (3GPP) Long Term Evolution (LTE) is a part of Evolved UMTS (E-UMTS) that uses E-UTRA. 3GPP LTE employs OFDMA in downlink and employs SC-FDMA in uplink. LTE-Advanced (LTE-A) is an evolved version of 3GPP LTE.

Terms to be used in an M2M system are defined as follows.

(1) Machine-to-Machine (M2M) communication: information exchange between user devices or between a server and a device in a core network, performed without human intervention.

(2) M2M ASN: access service network capable of supporting the M2M service.

(3) M2M device: UE or terminal having (or supporting) the M2M function.

(4) M2M subscriber: M2M service user equipment (UE).

(5) M2M server: entity capable of communicating with an M2M device, which provides an interface accessible by an M2M subscriber.

(6) M2M feature: feature of an M2M application supported by M2M ASN. One or more features may be needed to support the M2M application.

(7) M2M group: group of M2M UEs including a common M2M subscriber and/or the same M2M subscriber, that is, sharing one or more features.

M2M Group ID (MGID) and M2M UE (or device) ID(M-DID)

In a system supporting M2M communication, a base station (BS) can allocate a first ID indicating an M2M group having each M2M UE and a second ID indicating each M2M UE contained in the M2M group to a plurality of M2M devices. In this case, the first ID is used to identify each M2M group within the cell, and the second ID is used to identify each M2M device in a group including the M2M device. That is, the first ID is an M2M group ID, and the second ID is an M2M device ID.

In addition, the first ID may be a primary M2M Device ID, and the second ID may be a secondary M2M Device ID. For convenience of description, the first ID may be used as an M2M group ID, and the second ID may be used as an M2M device ID.

That is, M2M UEs can receive an M2M Group ID and M2M device ID to be used for communication with a BS from an M2M communication supporting system. In this case, the M2M communication system is a network entity coupled to a BS or a network. For example, the network entity may be an M2M server.

Although the 802.16 (specifically, 16m) system is disclosed only for illustrative purposes, a method of the embodiment is not limited only to the 802.16m system, and can also be applied to various systems such as LTE, LTE-A, etc.

FIG. 1 is a block diagram illustrating a wireless communication system according to an embodiment of the present invention.

A wireless communication system is widely deployed to provide a variety of communication services such as voice, packet data, etc.

Referring to FIG. 1, a wireless communication system includes a mobile station (MS) and a base station (BS). The MS denotes a mobile or fixed type MS. The MS may be referred to as, a User Equipment (UE), a User Terminal (UT), a Subscriber Station (SS), a Wireless Device, an Advanced Mobile Station (AMS), or the like. In addition, the MS 10 includes an M2M or MTC MS that supports M2M communication. The Base Station (BS) means a fixed station that performs communication with the MS 10. The BS 20 may be referred to another terminology such as an evolved-NodeB (eNB), a Base Transceiver System (BTS), and an Access Point (AP). One BS 20 includes one or more cells.

The wireless communication system may be an OFDM (Orthogonal Frequency Division Multiplexing) or OFDMA based system.

OFDM uses a plurality of orthogonal subcarriers. OFDM uses orthogonal characteristics between IFFT (Inverse Fast Fourier Transform) and FFT (Fast Fourier Transform). The transmitter performs IFFT processing of data and transmits the IFFT-processed data. The receiver recovers original data by performing FFT on a received signal. The transmitter performs IFFT to combine multiple subcarriers, and performs FFT to isolate multiple subcarriers from each other.

In addition, the slot is a minimum data allocation unit, and is composed of a time and a subchannel. In uplink, the subchannel may be composed of a plurality of tiles. The subchannel may be composed of 6 tiles. In uplink, one burst may be composed of 3 OFDM symbols and one subchannel.

In Partial Usage of Subchannels (PUSC) permutation, each tile may include four contiguous subcarriers on 3 OFDM symbols. Selectively, each tile may include three contiguous subcarriers on 3 OFDM symbols. A bin includes 9 contiguous subcarriers on an OFDM symbol. A band refers to a group of 4 rows of the bin, and an AMC (Adaptive Modulation and Coding) subchannel includes 6 contiguous bins in the same band.

Figure 2:
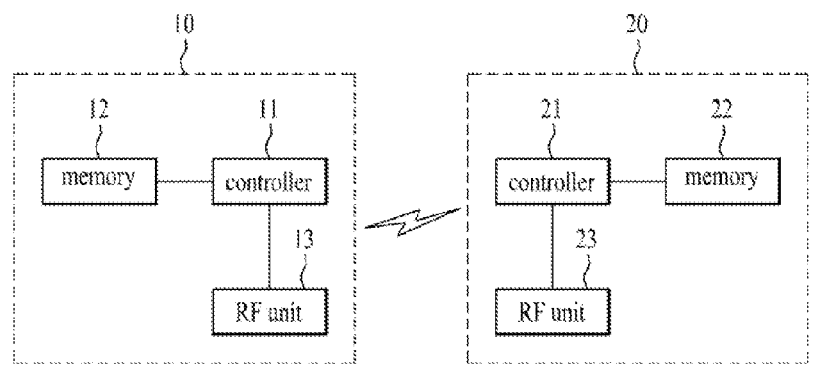
FIG. 2 is a block diagram illustrating a base station (BS) and a mobile station (MS) for use in a wireless communication system according to an embodiment of the present invention.

FIG. 2 is a block diagram illustrating a base station (BS) and a mobile station (MS) for use in a wireless communication system according to an embodiment of the present invention.

Referring to FIG. 2, the MS 10 includes a controller 11, a memory 12, and a radio frequency (RF) unit 13.

In addition, the MS 10 includes a display unit, a user interface unit, etc.

The controller 11 may be constructed to implement the functions, procedures and/or methods disclosed in the embodiments of the present invention. Layers of the radio interface protocol may be implemented by the controller 11.

The memory 12 may be connected to the controller 11, and store various protocols or parameters for RF communication. That is, the memory 12 stores an MS drive system, and application and general files.

The RF unit 13 is connected to the controller 11, and transmits and/or receives RF signals. In addition, the display unit may display various pieces of information of the MS and be a Liquid Crystal Display (LCD), an Organic Light Emitting Diode (OLED), etc. which are known in the art. The user interface unit may be configured to be combined with a known user interface such as a keypad, a touch screen, or the like.

The BS 20 includes a controller 21, a memory 22, and an RF unit 23.

The controller 21 may be constructed to implement the functions, procedures and/or methods disclosed in the embodiments of the present invention. Layers of the radio interface protocol may be implemented by the controller 21.

The memory 22 may be connected to the controller 21, and store various protocols or parameters for RF communication.

The RF unit 23 is connected to the controller 21, and transmits and/or receives RF signals.

The controllers 11 and 21 may include Application-Specific Integrated Circuits (ASICs), other chipsets, logic circuits, and/or data processors. The memory 12 and 22 may include Read-Only Memories (ROMs), Random Access Memories (RAMs), flash memories, memory cards, storage media, and/or other storage devices. The RF units 13 and 23 may include baseband circuits for processing radio signals. When the embodiments are implemented in software, the above methods may be implemented using modules (processes or functions) for performing the above functions. The modules may be stored in the memories 12 and 22 and executed by the processors 11 and 21.

The memories 12 and 22 may be placed inside or outside the controllers 11 and 21 and may be coupled to the controllers 11 and 21 by a variety of well-known means.

Figure 3:
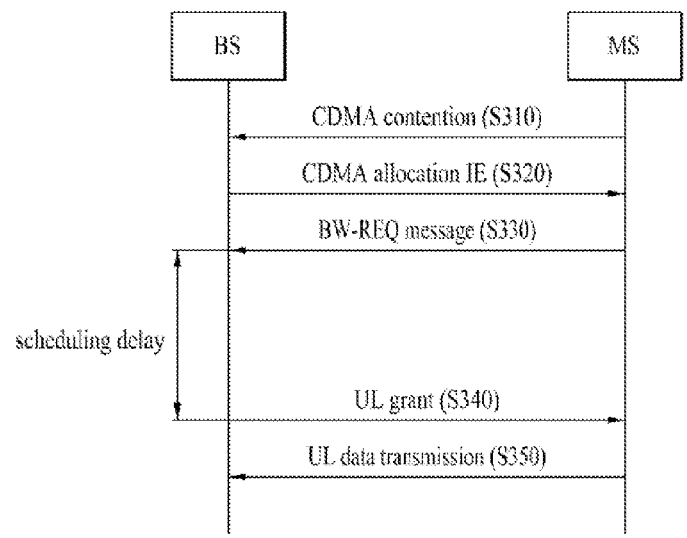
FIG. 3 is a flowchart illustrating a method for allocating UL resources of a UE or MS using a contention based request scheme.

FIG. 3 is a flowchart illustrating a method for allocating UL resources of an MS using a contention based request scheme.

Referring to FIG. 3, the MS transmits a randomly selected CDMA code to a slot randomly selected from among a region allocated for a bandwidth request on uplink in step S310.

If the BS recognizes the CDMA code sent from the MS, the BS allocates a resource via which the MS can transmit a bandwidth request message using a CDMA allocation information element (CDMA_allocation_IE) in step S320.

The MS having received UL resource information for transmission of the bandwidth request message transmits a bandwidth request message to the corresponding resource region. In this case, the MS may use a bandwidth request (BR) header, and the BR header may include information regarding a requested bandwidth size or the like in step S330.

If the BS uses an MS requested bandwidth, it transmits UL resources to the MS in step S340.

Thereafter, the MS transmits data to the allocated UL resource in step S350.

Figure 4:
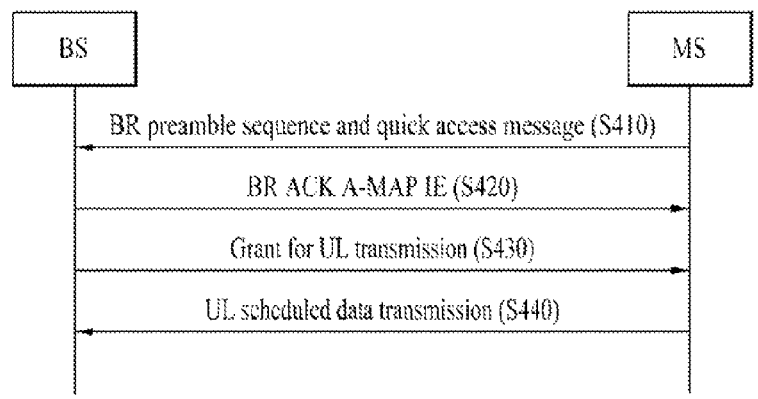
FIG. 4 is a flowchart illustrating an example of a bandwidth request process based on 3-step random access.

FIG. 4 is a flowchart illustrating an example of a bandwidth request process based on 3-step random access.

In a broadband wireless access system, the MS may use a 3-step or 5-step random access scheme. The 5-step random access scheme and the 3-step random access scheme are used independently of each other. The 5-step random access scheme may be used as a fall-back mode of the 3-step method. An advanced mobile station (AMS) transmits a bandwidth request preamble sequence and a quick access message to the BS at a randomly selected opportunity in step S410. In this case, the bandwidth request preamble sequence may be denoted by a BR code.

In this case, the quick access message may include UL bandwidth request (BR) information (e.g., a station ID, a BR size, a BR index indicating a QoS).

The BS transmits a BR ACK A-MAP information element (IE) indicating a reception status of both a BR preamble sequence sent from each MS and a quick access message to each MSs using a broadcast/multicast format in step S420.

In addition, the BS having normally received the BR preamble sequence and the quick access message allocates UL resources to each MS, and transmits UL resource allocation information to each MS through a UL basic assignment A-MAP IE in step S430. The MS can transmit UL data to the BS through the allocated UL transmission region. In this case, the MS can transmit additional UL bandwidth request (BR) information to the BS in step S440.

Figure 5:
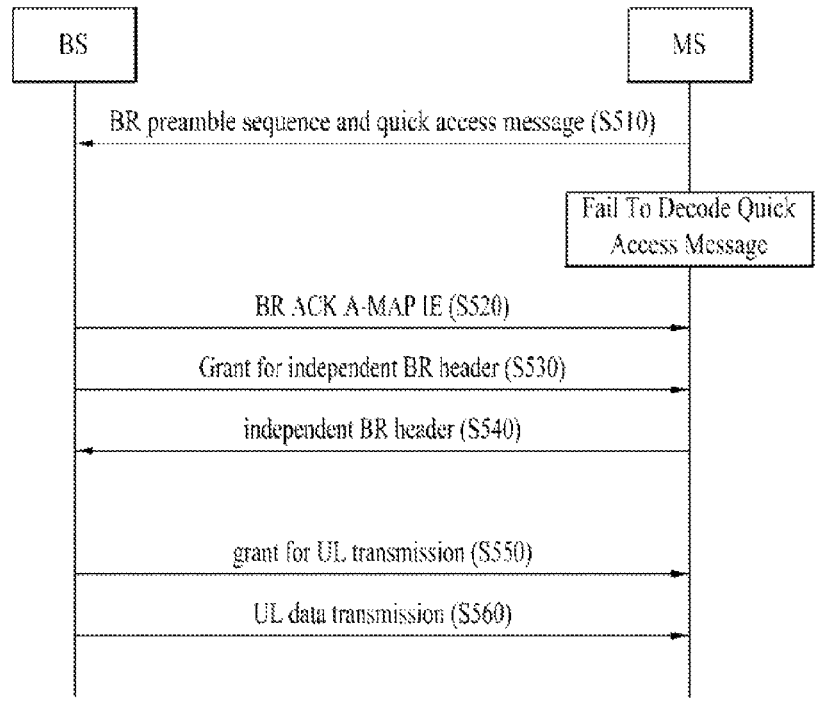
FIG. 5 is a flowchart illustrating an example of a bandwidth request process based on 5-step random access as a 3-step fall-back mode.

FIG. 5 is a flowchart illustrating an example of a bandwidth request process based on 5-step random access as a fall-back mode of 3-step random access.

Referring to FIG. 5, the MS transmits a BR preamble sequence (or a BR code) and a quick access message to the BS in step S510. The quick access message includes UL bandwidth request information (StationID) and a BR index indicating a request size and QoS.

The BS can transmit reception state information of the BR preamble sequence and the quick access message to each MS through the BR ACK A-MAP IE. However, it is assumed that the quick access message has an error although the BR preamble sequence is normally decoded. Therefore, the BR ACK A-MAP IE indicates that the BR preamble sequence denotes normal reception and the quick access message has an error in step S520.

The BS having normally received the BR preamble sequence from the MS allocates a UL resource for transmitting a bandwidth request (BW-REQ) message of the MS to the MS through a CDMA allocation A-MAP IE in step S530.

The CDMA A-MAP IE may be transmitted to the MS using a grant format for an independent BR in step S530.

The MS transmits a BW-REQ message (e.g., an independent BR header format) to the BS through the allocated region in step S540.

The BS having received the BW-REQ message from the MS transmits a UL resource to the MS through a UL basic assignment A-MAP IE or a UL data transmission grant message in step S550.

The MS transmits UL data to the BS through a UL resource region.

In this case, the MS can also transmit additional UL bandwidth request information to the BS in step S560.

That is, FIG. 5 shows 5-step random access as a fall-back mode of the 3-step random access shown in FIG. 4. However, according to the general 5-step scheme, the MS does not transmit a quick access message of the step S510 in a different way from FIG. 5. The remaining steps other than S510 may be identical to those of FIG. 5.

FIG. 6 is a diagram illustrating one bandwidth request channel structure.

Referring to FIG. 6, one BR channel includes three tiles. In this case, one tile includes 6 OFDM symbols on a time domain and 6 contiguous subcarriers on a frequency domain. Therefore, BR preamble sequences (Pr0~Pr23) are repeatedly transmitted in each tile, and quick access messages (M0~M5) are transmitted through three tiles.

A resource allocation method and a resource request method for performing UL transmission of the MTC MS according to the embodiment of the present invention will hereinafter be described in detail.

First Embodiment

In accordance with a first embodiment, the BS establishes a BR channel for only the MTC MS and transmits the BR channel to the MTC MS so as to implement a BR of the MTC MS, so that a method for transmitting a BR and a UL resource to the BS of the MTC MS will hereinafter be described in detail.

Figure 7:
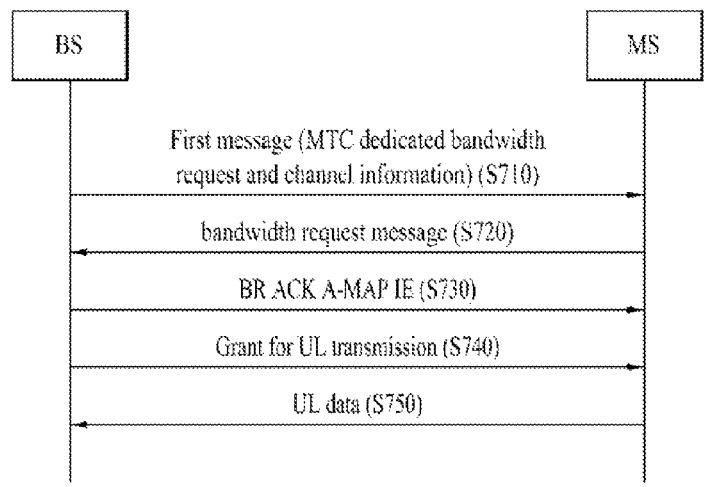
FIG. 7 is a flowchart illustrating a method for allocating a dedicated bandwidth channel to an MTC UE according to a first embodiment of the present invention.

FIG. 7 is a flowchart illustrating a method for allocating a dedicated bandwidth channel to an MTC UE according to a first embodiment of the present invention.

Steps (S730~S750) are identical to steps (S520, S550~S560), so that only different steps other than the same steps will hereinafter be described in detail.

Referring to FIG. 7, the BS transmits a first message to the MTC MSs in step S710. The first message includes MTC dedicated bandwidth request (BR) channel information for a bandwidth request (BR) of the MTC MSs. That is, the BS forms an MTC dedicated BR channel for only the MTC MSs, and transmits the MTC dedicated BR channel to each MTC MS. In this case, the first message may be broadcast for all the MTC MSs, or may be unicast only to specific MTC BSs.

In this case, the bandwidth request (BR) channel may be formed in a single RB or subframe or a plurality of RBs or subframes using Time Division Multiplexing (TDM) or Frequency Division Multiplexing (FDM).

In addition, the MTC MS can perform periodic UL transmission for the BS according to service and transmission traffic. Therefore, the BS can establish an MTC dedicated BR channel according to a UL transmission period of the MTC MS.

In addition, assuming that information to be transmitted from the MTC MS, and traffic and load thereof are determined, the BS receives a BR request from the MTC MS using a BR channel for only initial UL transmission of the MTC MS, and may use a UL resource, that has been allocated to the MTC MS by the BS, for UL transmission.

That is, the MTC MS requests a bandwidth request (BR) from the BS through the BR channel for UL transmission to the BS. Thereafter, the MTC MS may transmit a signal using initially allocated resources during UL transmission.

In this case, the first message may be a secondary superframe header sub packet 3 information element (S-SFH SP 3 IE) or A-MAP IE. In more detail, the BS may inform each MTC MS of BR channel information for only the MTC MSs using a broadcast or multicast scheme.

For example, the MTC dedicated bandwidth channel information may be transmitted to the MTC MS using the S-SFH SP 3 IE transmitted through a superframe header (SFH). In other words, using the remaining reserved cases from among 3 bits allocated for UL BW REQ channel information of HTC MSs, the NS can transmit BR channel transmission information for the MTC to the MTC device.

In this case, the BR channel transmission information may include a transmission period, location, and allocation information of the BR channel.

In another example, the BS can periodically transmit 3 bits to the S-SFH SP 3 IE so as to transmit MTC BW REQ channel information to the MTC device.

That is, as can be seen from the above description, information regarding a BR REQ channel of the MTC device may be transmitted using 3 additional bits, or information regarding the MTC BR REQ channel can be transmitted using 3-bit information transmitted for the HTC.

In addition, the BS can transmit MTC dedicated bandwidth channel information to the MT MS using the A-MAP. Namely, the A-MAP may be a user-specific A-MAP IE or a non-user specific A-MAP IE.

If the BS transmits MTC dedicated BR channel information to the MTC device using the user specific A-MAP IE, a dedicated resource (or region) for a BR can be allocated to each MTC device. Accordingly, the MTC device can perform a bandwidth request (BR) without performing contention between MTC devices in the BR region.

The MTC MS can transmit a bandwidth request (BR) message including at least one of a bandwidth request preamble and a quick access message to the BS through an MRC dedicated bandwidth channel received from the BS in step S720.

Here, the term "quick access message" is disclosed only for illustrative purposes, and may also be denoted by "bandwidth request (BR) information". That is, if the quick access message is denoted by the bandwidth request (BR) information, the bandwidth request (BR) information may include at least one of an STID, a BR indicator, a QoS, and a BR size.

The bandwidth request (BR) preamble and the quick access message may be contained in the bandwidth request (BR) message and then transmitted. The bandwidth request (BR) preamble and the quick access message can be transmitted to the BS respectively or simultaneously.

In this case, the quick access message includes at least one of STID and BR information of the MTC MS. The BR information refers to a BR indicator, a QoS, a BR size, etc. The BR information may be parameters that are determined when the MTC MS performs network entry to the BS.

That is, the MTC MS can transmit a BR message including a BR preamble and quick access message to the BS so that it can quickly access the BS at high speed. In addition, if the MTC MS firstly transmits only the BR preamble and receives an ACK message from the BS, the MTC MS can transmit at least one of STID and BR information to the BS.

In this case, the MTC MS generally has low mobility or no mobility, or periodically transmits fixed data, so that UL traffic variation of the MTC MS is not flexible. Therefore, when the MTC MS performs BR, only the STID is contained in the quick access message and the resultant quick access message can be transmitted to the BS.

In this case, the MTC MS does not transmit a quick access message but transmits only the STID to the BS, so that the MTC MS can quickly access the BS.

That is, when the BS performs network entry to the MTC MS, the BS can recognize a QoS, a UL resource size, a BR index, etc. required for the MTC MS so as to perform a bandwidth request according to MTC MS types or service types. Therefore, the MTC MS need not transmit additional information other than STID for BR over a BR channel.

In addition, the BR preamble may be generated using the STID of the MTC MS, or may be selected using some parts of the STID of a specific code set.

That is, the BS allocates a dedicated BR channel for each MTC device, and the MTC MS performs a BR through the dedicated BR channel, so that the MTC MS can quickly transmit signals to/from the BS.

The BS transmits a BR_ACK-A-MAP as a response to the BR message to the MTC MS. The BS allocates a grant for UL transmission or a UL resource. The MTC MS transmits UL data to the BS through a UL resource allocated from the BS.

Figure 8A:
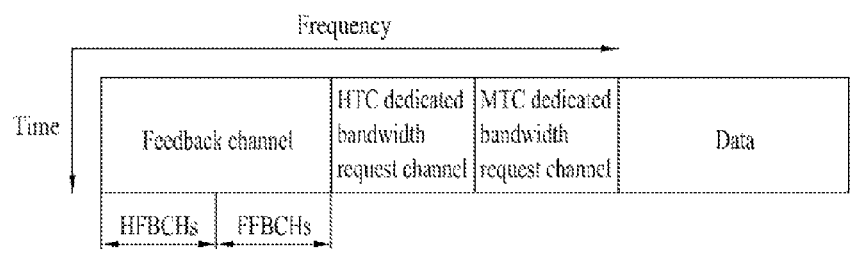
FIGS. 8A and 8B illustrate the locations of MTC-dedicated bandwidth request channels according to a first embodiment of the present invention.
Figure 8B:
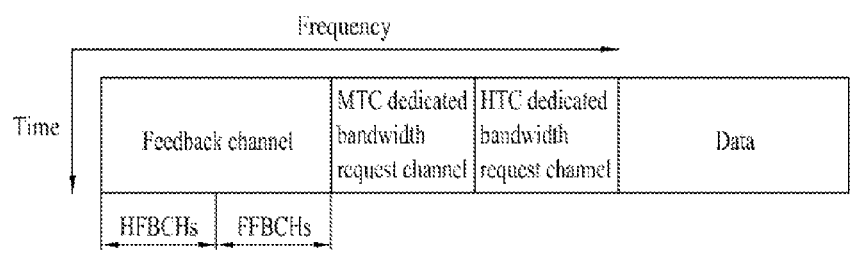

FIGS. 8A and 8B illustrate the locations of MTC-dedicated bandwidth request channels according to a first embodiment of the present invention.

Referring to FIG. 8A, the MTC BR_REQ channel may be located behind the HTC_BR_REQ channel. Referring to FIG. 8B, the MTC BR_REQ channel may be located in front of the HTC_BR_REQ channel.

FIGS. 9A to 9D illustrate bandwidth request channel structures used when only a bandwidth request preamble is transmitted according to a first embodiment of the present invention.

The MTC dedicated bandwidth channel includes three tiles.

In this case, one tile includes 6 subcarriers and 6 symbols. One tile includes at least one of a first region through which the BR preamble is transmitted and a second region through which the BR information is transmitted. In more detail, only the BR preamble may be transmitted through one tile, and a BR preamble and a quick access message may be simultaneously transmitted. FIGS. 9A to 9D illustrate an exemplary case in which only the BR preamble is transmitted through one tile.

In accordance with the above-mentioned case in which only the BR preamble can be transmitted through one tile, the BS can recognize bandwidth request (BR) information (QoS, UL resource size, BR index) by performing network entry to the MTC MS.

In addition, a BR preamble used for a bandwidth request (BR) may be a long preamble sequence. In this case, the long preamble sequence may be 36 sequences mapped to one tile or 108 sequences mapped to three tiles.

In addition, a long preamble sequence used as a BR preamble uses an orthogonal code so as to reduce detection facility and influence of interference between BR preambles.

Referring to FIGS. 9A to 9D, 36/108 sequences used for the BR preamble may be mapped to one or three tiles from among UL resources on the BR channel. In this case, sequences for BR preambles may be sequentially located at individual subcarriers in a time or frequency domain.

FIGS. 10A to 10C illustrate bandwidth request channel structures used when a bandwidth request preamble and a quick access message are transmitted according to a first embodiment of the present invention.

Referring to FIGS. 10A to 10C, the MTC MS can transmit the BR preamble and the quick access message to the BS through the BR channel.

In this case, considering not only transmission efficiency of the BR signal, but also STID (larger than an STID of the 16m MS ID) and BR information allocated to the MTC MS, many more subcarriers than subcarriers allocated for information transmission may be required for the 16m MS transmitting the corresponding information.

Referring to FIGS. 10A to 10C, one tile includes at least one subtile. The subtile includes one subcarrier and 6 symbols. That is, one tile may be composed of a maximum of 6 subtiles.

In this case, if the single tile includes the first region and the second region, i.e., if the BR preamble and the quick access message are transmitted through one tilee, the second region may be mapped to second and fourth subtiles of the single tile.

Referring to FIGS. 10A to 10C, [4(subcarriers)×6(symbols)] of the single tile may be allocated for transmission of the quick access message, and the remaining parts other than [4(subcarriers)×6(symbols)] may be used for transmission of the BR preamble.

In this case, the BR preamble code using a long sequence is transmitted through three tiles. In this case, the quick access message and the preamble code loaded on the tile may be sequentially located at subcarriers of the tile according to time or frequency.

In another example, although the same number of subcarriers are allocated to each of the quick access message and the BR preamble as in the legacy 16m, the quick access message may be located at the second or fourth position of one tile using the center part [1(subcarrier)×6(symbols) part] of subcarriers each including the BR preamble as a basic structure.

Second Embodiment

In accordance with the second embodiment, the MTC MS does not use the BR channel, and performs bandwidth request (BR) for UL transmission using the MAC message or MAC signaling header.

First, the MTC MS performs BR for the BS using the MAC message or MAC header including an STID.

It is assumed that the MTC MS and a Human Type Communication (HTC) MS [16m support MS] have different sizes of STIDs.

In this case, the BS can recognize information of the MS through an STID received from the MS. That is, the MTC MS does not receive an additional BR channel from the BS for a bandwidth request, and can perform a BR using the MAC message or MAC header including the STID.

The BS decodes an MAC message or MAC header received from the MS, and cts an STID contained in the MAC message or MAC header, so that it can obtain MS information (for example, MS type (HTC, MTC)).

Therefore, the MTC MS transmits the MAC message or MAC header including the STID to the BS so as to perform a BR, minimizes influence of the BR of the HTC MS (e.g., 802.16 MS) contained in the cell, and can receive UL transmission resources from the BS without interference.

In this case, the MTC MS need not perform additional processing for identifying an MS type, so that BR complexity of the MTC MS can be greatly reduced.

In addition, each MTC MS can transmit a bandwidth request message for UL transmission to the BS according to service types supported by the BS at intervals of a short time or a long time, such that the MTC MS can perform smooth UL transmission.

Second, the BS can allocate dedicated resources for transmission of a BR message to the MTC MS.

In the same manner as in the first case, if the MTC BS requests a BR from the BS using the MAC message or MAC header, the BS can allocate a resource for BR message transmission to each MTC MS. In this case, the MTC MS is configured to use only a resource region given to the MTC MS. In this case, the BS transmits a transmission region of the BR message to each MS, so that the BS need not transmit/receive additional signals for recognizing the MS requesting the BR.

Here, UL resource information allocated for a BR of the MTC MS can be transmitted to each MS through the A-MAP IE.

In addition, since a large number of MTC MSs are contained in the cell, several MSs or grouped MSs may share resources allocated for BR. In this case, if several MSs share resources, the MSs can classify the shared resources into TDM or FDM.

In addition, the shared resources may perform a BR by sequentially using the shared resources according to the ordering between grouped or paired MSs or the BR period of MSs.

In addition, if the MTC MS transmits fixed data through the UL region at intervals of a predetermined time, the MTC MS may receive a dedicated UL resource from the BS without performing a BR for UL transmission, and may transmit UL resources to the BS.

In this case, when the MTC MS performs network entry to the BS, the UL region allocated to the MTC MS may be determined considering a QoS, traffic, and a BR size for each MTC MS through a process for negotiating with the BS.

As described above, the UL resource for each MTC MS decided by the negotiation with the MS is transmitted to each MTC MS through the A-MAP. The MTC MS can transmit a Ul signal to the BS using a dedicated Ul resource allocated from the BS at intervals of a predetermined time. In this case, the dedicated Ul resource may be allocated to the entire UL region or a UL region of the MTC zone.

In another example, when the MTC MS performs network entry to the MS, it can perform UL transmission to the BS without using a BR using a resource region received through the CDMA_allocation message in such a manner that the MTC MS can perform ranging.

Third Embodiment

In accordance with the third embodiment, the MTC MS is switched from an idle or sleep mode to an active mode, such that it can quickly perform network entry or re-entry to the BS or network. That is, the third embodiment can provide a quick access process and a signal transmission process for the quick access to the BS or the network of the MTC MS.

First, the BS or network can allocate a dedicated access code or ranging codeword (or sequence) so as to perform network (re)entry to the MTC MS.

In this case, the dedicated access/ranging codeword (or sequence) may be transmitted to the MTC MS through A-MAP, M2M_RNG-info_signal, PDCCH, etc. If the dedicated access/ranging codeword (or sequence) performs initial network entry, the dedicated access/ranging codeword (or sequence) can be transmitted to the MTC MS through the registration response (REG-RSP) message.

A method for performing quick access when the MTC BS performs BS or network entry or re-entry process will hereinafter be described in detail.

First, the MTC MSs receive control information including the MTC dedicated access/ranging sequence from the BS. In this case, the control information may be broadcast or unicast to the MTC BS. The control information may be a user specific map message or a PDCCH.

Thereafter, the MTC MS performs ranging with the BS or network through the MTC dedicated access/ranging sequence (quick access signal).

The BS does not perform blind decoding of the MTC dedicated access/ranging sequence sent from the MTC MS, directly detects the MTC dedicated access/ranging sequence, and recognizes information regarding the MTC MS through the MTC dedicated access/ranging sequence.

The BS allocates a dedicated codeword (or sequence) to each MTC MS, so that it can recognize an STID, class, service type, etc. of the MTC MS through the detected MTC dedicated access/ranging sequence. In addition, the BS can discriminate between the HTC MS and the MTC MS through the MTC dedicated access/ranging sequence.

Thereafter, the BS transmits information (e.g., resource allocation, power control, MCS, etc.) required for transmitting/receiving signals to/from the BS to the MTC MS.

The control information may be transmitted through an SFH, A-MAP, ABI (Additional Broadcast Information), MIB or SIB. In this case, the BS or network can transmit the MTC dedicated access/ranging sequence to the MTC MS using a bitmap or table format.

That is, if the MTC MS performs BS or network entry/re-entry process, an indicator, value or offset value capable of selecting the MTC dedicated codeword or sequence in the bitmap or table can be transmitted to the MTC MS.

In addition, the MTC dedicated codeword or sequence can be allocated to each MS using the orthogonal code or CAZAC sequence so as to prevent the occurrence of access collision between MTC MSs.

The BS may generate the MTC dedicated codeword by performing CRC masking of an STID (Station Identification) of each MTC MS in association with the ranging sequence for the MTC MS, allocates the MTC common access (or ranging) codeword/sequence to each MTC MS, and transmits associated cyclic shift or spread value, so that it can generate the MTC dedicated codeword for the MTC MS.

In this case, the common access codeword or sequence is transmitted to the MS using the SFH, ABI, etc. The cyclic shift value or offset may be transmitted to the MTC MS using user specific A-MAP, unicast signal, M2M RNG info, etc.

In another example, a method for enabling the MTC MS to allocate the MTC MS dedicated access/ranging region so as to perform BS or network re-entry will hereinafter be described in detail.

In order to perform the re-entry procedure in the idle mode, the HTC MS transmits a ranging sequence for each MS to the BS or network using the HO ranging region. The HTC MS transmits signals using the same HO ranging region and each MS can receive a response message to a signal transmitted via contention, so that a long period of time is consumed for performing re-entry.

The MTC MS must satisfy various requirements according to a usage model, service type, and emergency case. For example, the security sensor or the health care machine requests quick access from the BS or network when an emergency situation occurs. Therefore, for quick access of the MTC MS, whereas the legacy HTC MSs transmit the ranging sequence using the HO ranging region, a specific region from among the ranging regions is dedicatedly allocated to the MTC MS, and the MTC MS transmits the allocated MTC ranging sequence only to the allocated region, so that the quick detection and network access procedure for the MTC MS can be performed.

Alternatively, an additional ranging region for MTC MSs is established, or the dedicated access region is established for each MTC MS, so that the above-mentioned procedures can be performed. In this case, the dedicated ranging region allocated to the MTC MS can be determined in various symbols or subframes using TDM/EDM. The dedicated access region allocated for access of the MTC MSs may be located prior to the ranging region of the legacy MSs (e.g., 16m, LTE(-A) MS).

In order to transmit the dedicated ranging region information allocated to the MTC MSs, the BS or network can utilize the following methods (1) to (3).

(1) Information regarding the ranging region can be transmitted to the MTC MS through a broadcast or multicst signal.

For example, the 16m system transmits information regarding the ranging region to the HTC MS through the SHF, A-MAP, etc. The BS can transmit information regarding the dedicated ranging region allocated to each MTC MS through SFH, A-MAP, and M2M RNG Info.

(2) In the case of using the dedicated access/ranging region for transmitting the entry/re-entry signal to each MTC MS, information regarding the region allocated to the MS can be transmitted to each MTC MS through A-MAP_IE, unicast signal (e.g., user specific A-MAP, M2M RNG allocation IE) or PDCCH.

(3) Through a broadcast message without making a distinction between the HTC MS and the MTC MS, the BS can transmit not only information of the entire ranging region received from the BS through a broadcast message, but also information of the dedicated ranging resource contained in the ranging region allocated to the MTC MS using offset values (for example, start point, allocation RB, num of symbol, num of subcarrier, and band index end point).

The offset value may be represented in a time or frequency domain. On the basis of the number of symbols or subcarriers ranging from the start point of the ranging region to the start point of the region allocated to each MS, the offset value is determined and then transmitted to the MS.

In addition, the offset value transmitted from the BS to the MS may be given in units of a subcarrier within one or more symbols. In contrast, the offset value may be given in units of a symbol within one or more subframes. For example, in case of the 16m system, the entire dedicated ranging region information may be transmitted to all MSs using broadcast information such as SFH. In addition, an offset value for each region allocated to the MTC MS can be transmitted to the MTC MS using user-specific information, M2M RNG Info and PDCCH of the A-MAP.

In this case, if the BS allocates MTC dedicated resources (dedicated resource, codeword or TDM/FDM resource region) for quick access, the MTC dedicated resources may be allocated to each MTC MS or MTC MS group.

In addition, the BS may differently allocate the MTC dedicated resources according to the MTC feature or class.

That is, assuming that the MTC MS has time-controlled operation characteristics according to the MTC MS features (for example, assuming that the MTC BS is operated in a specific time), the dedicated codeword may be dedicated only for the corresponding specific time, and may be used by another user or the MS (HTC MS, another time-controlled MTC device or arbitrary MTC device). In this case, information required when a codeword is dedicated for a specific MTC MS must also be signaled to another MTC MS.

The invention claimed is:

1. A method for performing uplink (UL) transmission through random access in a wireless communication system, the method comprising:

receiving, by a Machine Type Communication (MTC) mobile station (MS) from a base station (BS), a first message including information on a MTC dedicated bandwidth request channel,
wherein the MTC dedicated bandwidth request channel is an exclusive bandwidth request channel for the MTC MS to perform a bandwidth request; and
transmitting, by the MTC MS through the MTC dedicated bandwidth request channel to the BS, a bandwidth request preamble and bandwidth request information,
wherein the bandwidth request information includes an MTC MS identifier (ID), a Quality of Service (QoS), a bandwidth request indicator, and a bandwidth request size, and
wherein the MTC dedicated bandwidth request channel information includes location, period, and length information of the MTC dedicated bandwidth request channel.

2. The method according to claim 1, further comprising:
receiving a bandwidth request acknowledgement A-MAP information element ($BR_{13}$ ACK A-MAP IE) from the base station;
receiving an uplink (UL) grant for UL transmission from the base station; and
transmitting UL data to the base station through the received UL grant.

3. The method according to claim 1, wherein the MTC dedicated bandwidth request channel is received from the base station through at least one subframe using Time Division Multiplexing (TDM) or Frequency Division Multiplexing (FDM).

4. The method according to claim 1, wherein the MTC dedicated bandwidth request channel is located in front of or behind a bandwidth channel for a Human Type Communication (HTC) mobile station (MS).

5. The method according to claim 1, wherein the first message is a secondary superframe header subpacket information element (S-SFH SP IE) or an A-MAP information element (A-MAP IE).

6. The method according to claim 5, wherein the S-SFH SP IE is an S-SFH SP 3 IE, and the A-MAP IE is a user-specific A-MAP IE or a non-user specific A-MAP IE.

7. The method according to claim 1, wherein the first message is transmitted using a broadcast or unicast scheme.

8. The method according to claim 1, wherein the MTC dedicated bandwidth request channel includes three tiles, each of the tiles includes 6 subcarriers and 6 symbols,
wherein the each of the tiles includes at least one of a first region via which the bandwidth request preamble is transmitted or a second region via which the bandwidth request information is transmitted.

9. The method according to claim 8, wherein the bandwidth request preamble is a long preamble sequence corresponding to either 36 sequences mapped to one tile or 108 sequences mapped to three tiles.

10. The method according to claim 8, wherein:
the each of the tile includes at least one subtile,
the subtile includes one subcarrier and 6 symbols, and
if the one tile includes the first region and the second region, the second region is mapped to second and fourth subtiles contained in the one tile.

11. A Machine Type Communication (MTC) mobile station (MS) for performing uplink (UL) transmission through random access in a wireless communication system, the mobile station (MS) comprising:
a radio frequency (RF) unit; and
a controller coupled to the RF unit,
wherein the controller is configured to control the RF unit to
receive, from a base station (BS), a first message including information on a MTC dedicated bandwidth request channel,
wherein the MTC dedicated bandwidth request channel is an exclusive bandwidth request channel for the MTC MS to perform a bandwidth request, and
transmit a bandwidth request preamble and bandwidth request information to the base station (BS) through the MTC dedicated bandwidth request channel,
wherein the bandwidth request information includes an MTC MS identifier (ID), a Quality of Service (QoS), a bandwidth request indicator, and a bandwidth request size, and
wherein the MTC dedicated bandwidth request channel information includes location, period, and length information of the MTC dedicated bandwidth request channel.

* * * * *